Feb. 28, 1961 H. SCHMID 2,973,146

COMPUTER MULTIPLIER

Filed Oct. 30, 1957

HERMAN SCHMID
INVENTOR

BY Richard D. Stephens

ATTORNEY 2,973,146

COMPUTER MULTIPLIER

Herman Schmid, Binghamton, N.Y., assignor to General Precision, Inc., a corporation of Delaware Filed Oct. 30, 1957, Ser. No. 693,298
6 Claims. (Cl. 235—194)

This invention relates to an improved electronic multiplier, and more particularly, to a four-quadrant time-division multiplier. In the analog computer, automatic control and instrumentation arts, much apparatus involves circuitry designed to multiply computer quantities, and considerable effort has been expended on the design and development of circuits which will provide an output voltage which varies in accordance with the product of two independently varying input voltages. A number of multipliers have been developed in which the area of electrical pulses have been varied by varying pulse height and width, pulse slope and width, or pulse phase. The pulses are then filtered or integrated, to provide an output voltage which varies as the product of the two variables in accordance with which the two pulse parameters have been varied. Multipliers of these types are known in the art generally as time-division multipliers. Several different types of time-division multiplier as discussed in chapter VI of "Electronic Analog Computers" by Korn & Korn, McGraw-Hill, New York (1952); "Analogue Multiplying Circuits Using Switching Transistors," IRE Convention Record (part 4) (1956); "Triangular Wave Analog Multiplier" by Meyers and Davis, Electronics, August, 1956; and "A High Accuracy Time-Division Multiplier" by Sternberg, RCA Review, vol XIII, September 1952.

It is quite desirable, of course, that any electronic multiplier be very accurate, reliable, and inexpensive. Due to their greater reliability, lower power consumption and several other advantages, transistors have been substituted for vacuum tubes in recent years in many forms of electronic apparatus, including time-division multipliers. Such substitutions largely have been made, however, in accordance with well-recognized principles of duality, so that the substituted transistors perform the same functions as the vacuum tubes they have replaced, though with greater reliability, less power dissipation, and often with other improvements, such as frequency response. The present invention, on the other hand, utilizes transistor characteristics which have no counterpart in vacuum tube operation, to provide an electronic multiplier of considerable accuracy. The invention utilizes novel switching arrangements wherein transistors are connected so as to perform the functions of an almost ideal switch. Transistors may be operated bi-directionally, while vacuum tubes are essentially unidirectional in operation. In addition to this fundamental difference, the ease with which transistor circuits may be used in accordance with the present invention to operate with great dynamic range, allows construction of a reliable multiplier having improved accuracy.

It is therefore a primary object of the invention to provide an improved four-quadrant time-division multiplier which uses transistor switching circuits in novel manner to provide accurate operation.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which.

Figures 1, 2, 3:
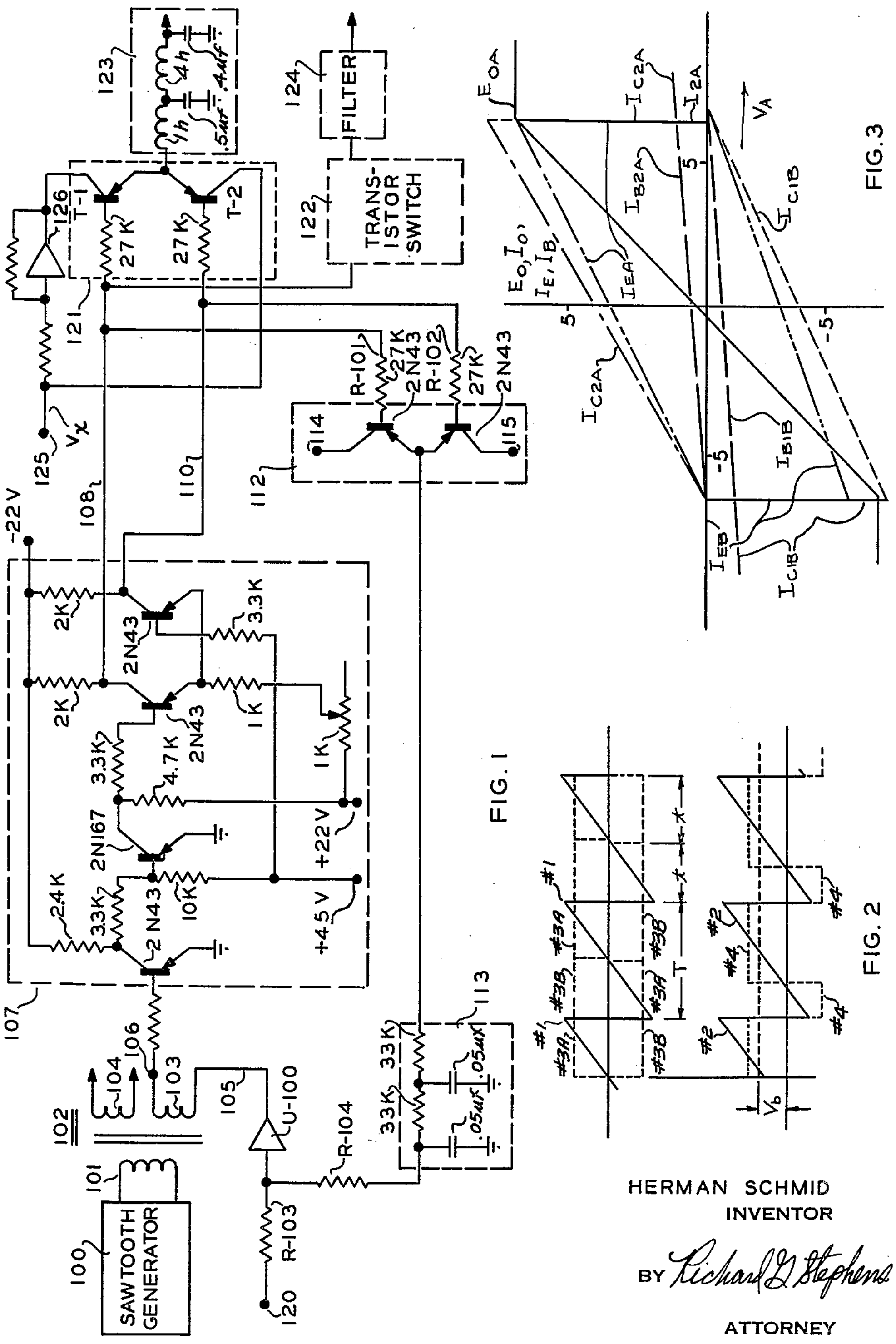
Fig. 1 is an electrical schematic diagram illustrating an exemplary embodiment of the invention, with certain parts shown in symbol form for clarity.
Fig. 2 is a waveform diagram useful in understanding operation of the device of Fig. 1.
Fig. 3 is a graph useful in understanding operation of the novel transistor switches of the invention.

Referring to the exemplary embodiment of Fig. 1, an oscillator or other source of alternating voltage shown in block form as comprising a sawtooth generator 100 supplies an alternating voltage of fixed amplitude and fixed frequency to the primary winding 101 of transformer 102. Preferably a sawtooth current is supplied to winding 101, so that a sawtooth voltage is induced in each secondary winding of transformer 102. Assuming that conductor 105 lies at ground or zero potential, it will be recognized that the sawtooth voltage at terminal 106 of secondary winding 103 will have equal positive and negative excursions, being positive for precisely one half cycle and negative for precisely one half cycle. A plot of the voltage at terminal 106 under such conditions is shown as waveform #1 of Fig. 2. Only one oscillator alternating voltage source need be supplied for a large number of multipliers, and transformer 102 may be provided with a plurality of secondary windings to drive a plurality of multipliers constructed in accordance with the invention. While Fig. 1 discloses a specific method of superimposing an alternating voltage and a direct voltage, various other means are well known and may be used without departing from the invention.

If a direct voltage potential exists on conductor 105, it will be seen to shift the mean or average level of the potential at terminal 106. If conductor 105 is positive with respect to ground, it will be seen that the alternating potential at terminal 106 will be positive with respect to ground for more than one half cycle and negative with respect to ground for less than one half cycle. A plot of such a voltage is shown as waveform #2 of Fig. 2. It should be apparent that existence of a negative voltage on conductor 105 will make terminal 106 be negative for more than one half cycle and positive for less than one half cycle. The alternating voltage at terminal 106 is applied to a limiter amplifier shown within dashed lines at 107. The function of limiter amplifier 107 is to convert the alternating voltage at terminal 106 into square wave or block pulses. Limiter 107 is shown as comprising two grounded emitter amplifier stages and a push-pull or dual output stage. The limiter amplifier is over-driven, so that full positive output appears in conductor 108 whenever terminal 106 becomes slightly (about 20 millivolts) negative with respect to ground, and at the same time, to provide full negative output on conductor 110. Limiter 107 is shown as comprising a transistorized limiter amplifier but may comprise a conventional vacuum tube limited amplifier, or a bi-stable circuit, without departing from the invention. Shown as waveform #3A of Fig. 2 is a plot of the voltage on conductor 108 when conductor 105 lies at ground potential, and it will be seen that the voltage consists of positive and negative pulses of equal time duration, each pulse having a duration of one half cycle. The accompanying voltage appearing on conductor 110 under such condition is shown as waveform #3B of Fig. 2. If a constant positive voltage exists on conductor 105, so that the alternating potential at terminal 106 varies as shown in waveform #2 of Fig. 2, the output voltage on conductor 110 will be positive for more than one half cycle as shown in waveform #4 of Fig. 2, and the output voltage in conductor 108 will be negative for more than one half cycle. If the sawtooth potential at terminal 106 is precisely linear, it should be apparent without further explanation that the increase in time duration of the positive pulses on conductor 108 and the increase in time duration of the negative pulses on conductor 110 will be directly proportional to the magnitude of the positive direct voltage existing on conductor 105. Conversely, if conductor 105 becomes negative with respect to ground, it will be seen that the resulting increase in time duration of negative pulses on conductor 108 and increase in time duration of positive pulses on conductor 110 will be directly proportional to the negative voltage on conductor 105, assuming again that a linear sawtooth voltage is induced in secondary winding 103. Thus it will be seen that the function of the sawtooth voltage and limiter 107 is to convert the direct voltage existing on conductor 105 into a pair of inverse or push-pull time-modulated signals. Since limiter amplifier 107 saturates whenever the voltage at terminal 106 slightly exceeds a few millivolts, the amplitudes of the positive and negative pulses on conductors 108 and 110 are determined by the power supply potentials applied to the limiter, and the amplitudes of the pulses remain constant throughout the pulse durations.

A direct viltage potential commensurate with one analog variable is applied at terminal 120 via scaling resistor R–103 to the input circuit of a conventional D.C. amplifier U–100 shown in symbolic form. Neglecting for the moment the feedback connection through resistor R–104, and assuming that amplifier U–100 is linear, it will be seen that the potential on conductor 105 would vary in accordance with the analog variable, so that the pulses on conductors 108 and 110 would be time-modulated in accordance with the value of the variable, which may be termed the *y* variable for convenience of explanation. The time-modulated pulses on conductors 108 and 110 are demodulated by a transistor switching circuit indicated generally at 112 and a filter shown within dashed lines at 113, providing a direct voltage feedback signal which is applied to amplifier U–100 via feedback scaling resistor R–104. Thus it may be seen that amplifier U–100 is connected in a closed loop circuit, and conventional feedback amplifier analysis will apply.

Designating the period of one sawtooth wave as T, the sawtooth amplitude as $V_s$, the period or width of a pulse on conductor 108 or conductor 110 as *t*, and the bias or offset voltage on conductor 105 as $V_b$, all as indicated in Fig. 2, the following relationship may be written:

$$t=\frac{T}{2}\frac{V_s+V_b}{V_s}\text{ or }\frac{t}{T}=\frac{1}{2}\left(1+\frac{V_b}{V_s}\right)\tag{1}$$

If stable and accurate reference voltages of magnitude $V_r$ and of opposite polarities are connected to terminals 114 and 115 of switching circuit 112, the amplitudes of the pulses applied to the switching circuit from conductors 108 and 110 will be limited very accurately to the values of the reference voltages, in a manner to be described below in greater detail. The demodulated or mean level value of the pulses applied to switching circuit 112 may be seen to be related to the filtered feedback voltage $V_f$ applied to amplifier U–100 in the following manner:

$$V_f=-V_r\left(1-2\frac{t}{T}\right)\tag{2}$$

Substituting *t*/T as defined in Equation 1 into Equation 2:

$$V_f=-V_r\left[1-\frac{2}{2}\left(1+\frac{V_b}{V_s}\right)\right]=\frac{V_rV_b}{V_s}\tag{3}$$

The bias or offset voltage $V_b$ on conductor 105 may be seen to be proportional to the resultant input voltage applied to amplifier U–100 multiplied by the gain A of the amplifier. The resultant input voltage may be seen to be proportional to the sum of the *y* independent variable input voltage $V_y$ applied at terminal 120 and the feedback voltage $V_f$ applied via resistor R–104. Therefore, if $V_f$ in Equation 3 is replaced by $$\frac{V_rV_b}{V_s}$$

$$V_b=(V_y+V_f)A=AV_y+\frac{AV_rV_b}{V_s}\tag{4}$$

$$V_b=\frac{AV_y}{1-\frac{AV_r}{V_s}}\tag{5}$$

Substituting the expression of Equation 5 for $V_b$ in Equation 1:

$$1-2\frac{t}{T}=1-\frac{2}{2}\left(1+\frac{V_b}{V_s}\right)=\frac{\frac{AV_y}{1-\frac{AV_r}{V_s}}}{V_s}\tag{6}$$

Multiplying through by $V_s$:

$$1-2\frac{t}{T}=\frac{AV_y}{V_s-AV_r}\tag{7}$$

By providing amplifier U–100 with sufficient gain, the quantity $AV_r$ can be made to be many times larger than $V_s$, so that Equation 7 may be written with negligible error as follows:

$$\left(1-2\frac{t}{T}\right)=\frac{-V_y}{V_r}k\tag{8}$$

where *k* is a scaling constant.

From Equation 8 it may be seen that the output time modulation $$\left(1-2\frac{t}{T}\right)$$

on conductors 108 and 110 is directly proportional to $V_y$, the *y* independent variable input potential, and inversely proportional to $V_r$, the reference voltage applied to switching circuit 112. When the gain A of amplifier U–100 is high, the time modulation $$\left(1-2\frac{t}{T}\right)$$

will now be seen to be independent of the amplitude, linearity and frequency of the sawtooth wave, and hence it may be apparent now that the alternating voltage source 100 may be a sine wave source rather than a sawtooth wave source if desired.

If constant reference voltages are applied to terminals 114 and 115, so that $V_r$ of Equation 8 is a constant, the time modulation will be seen to be dependent solely upon $V_y$, the applied potential representing the independent variable *y*. If the reference voltages applied at terminals 114 and 115 are made to vary in accordance with a second independent variable *z*, the circuit will function as a divider. Operation as a divider may be understood by comparison of the circuit of Fig. 1 with that of a conventional feedback amplifier division circuit, which need not be shown herein. Those skilled in the art realize that if the feedback voltage of a feedback amplifier is modified in accordance with an independent variable, that the amplifier operates to provide an output voltage which varies inversely with said variable. If the reference voltages at terminals 114 and 115 are made to increase in accordance with a *z* variable, the amplitudes of the pulses passing through switching circuit 112 will increase correspondingly. As in conventional feedback amplifiers, use of a weak feedback signal, which occurs when the magnitudes of the potentials at terminals 114 and 115 become small, provide less accurate and less linear operation, so division by small values will provide more error than otherwise. In the embodiment shown the gain around the feedback loop was of the order several million for D.C., but of the order of 10,000 to 20,000 at about 10 cycles per second.

Use of high amplifier gain may be seen to make the time modulation less dependent on frequency, linearity and amplitude of the alternating voltage source. On the other hand the end purpose of the portions of the circuit thus far described is solely the provision of an accurately time-modulated signal, and if a precisely linear sawtooth voltage is available, the invention may be operated without amplifier U–100 and the feedback loop shown.

The time-modulated pulses on conductors 108 and 110 are applied to one or more transistor switching circuits 121, 122, etc. As many transistor switches as desired may be connected to the output terminals of limiter 107 by providing sufficient power output from amplifier 107. Each transistor switch provides means for multiplying by a separate second independent variable. Transistor switch 121 may be seen in Fig. 1 to comprise two emitter-to-emitter connected PNP transistors. The operation of each switch is similar to that of an ideal single-pole double-throw switch. The width or time duration of each pulse applied to the switch has been shown to be directly proportional to the value of the $y$ variable. If switch 121 will govern the amplitude of each pulse in accordance with the value of a second independent variable, the $x$ variable, it will be seen that pulse area will vary in accordance with the product $xy$ of the two variables, and if the pulses are averaged by means of a suitable filter, a direct output voltage varying in accordance with the product of the two variables will be achieved. It should be apparent at this point that either or both of the independent variable input voltages may be made either positive or negative, and that a correct multiplication will occur, with the signs of the input variables being appropriately considered throughout all four quadrants of operation. The bi-directional operation of transistors makes such multiplier operation possible by simple circuitry. Since the transistor switches decrease or limit the amplitudes of the pulses on conductors 108 and 110, it should be apparent at this point that the blocking amplifier 107 should be arranged to provide square wave voltages of an amplitude slightly greater than the largest $x$-variable voltage to be multiplied.

For ease of explanation, assume that time-modulated pulses having amplitudes of 10 volts are present on conductors 108 and 110. Also assume that the instantaneous value of the $x$ variable is proportional to 6, and that 6 volts are present at terminal 125. The 6 volt potential is applied in one polarity directly to the collector electrode of transistor T–2 and in opposite polarity to the collector electrode of transistor T–1, a conventional unity-gain D.C. amplifier 126 being shown as a polarity-inversion means.

With −6 volts on the collector of T–1 and +6 volts on the collector of T–2, transistor T–1 functions as an emitter follower having T–2 as its load impedance during any time that the T–1 base drive voltage $V_A$ applied from conductor 108 and its inverse, the base T–2 drive voltage $V_B$ applied from conductor 110, are less in magnitude than the magnitude of the $x$ variable voltage (assumed to be 6 volts) on the transistor collector electrodes. Thus as the $V_A$ voltage rises from zero in a positive direction, the output voltage at the transistor emitter electrodes follows closely. Inasmuch as the pulses have almost vertical leading and trailing edges, it will be seen that operation of the transistor as an emitter follower occurs only for an extremely brief period. In a PNP transistor the collector-base junction is forward-biased whenever the collector is positive with respect to the base, and conversely the collector-base junction is reverse-biased whenever the base is positive with respect to the collector. Similarly, the emitter-base junction is forward-biased whenever the emitter is positive with respect to the base, and reverse-biased whenever the base is positive with respect to the emitter.

As the $V_A$ voltage reaches and exceeds positive 6 volts, while simultaneously the $V_B$ voltage reaches and exceeds minus 6 volts, it will be seen that the collector-base junction of transistor T–1 is made increasingly reverse biased, and the collector-base junction of transistor T–2 also is made increasingly forward biased. As the base drive voltages begin to exceed the collector voltages, the emitter-base junction of T–2 now becomes forward biased, with the result that transistor T–2 conducts at the same time the emitter of T–1 now becomes reverse biased, cutting off T–1. With T–1 cut off and T–2 conducting, it will be seen that the output voltage at the emitters will be very nearly that of the $x$-variable voltage of +6 volts present at the collector electrode of transistor T–2. The output voltage will differ from 6 volts only by approximately one millivolt. As the base drive voltage $V_A$ continues upwardly to 10 volts and remains at 10 volts throughout the duration of the positive $V_A$ pulse, the output voltage at the emitters will remain at six volts. When the $V_A$ voltage starts down at the trailing edge of the pulse, the output voltage remains at six volts until $V_A$ reaches and begins to become less than 6 volts. The circuit then becomes an emitter follower again, and the output voltage swings with the $V_A$ base voltage from +6 volts through zero or ground toward −6 volts. As the $V_A$ pulse becomes more negative than −6 volts, it will be seen that the emitter and collector of T–1 each will be forward biased, causing T–1 to conduct, while the emitter and collector of T–2 each will be reverse-biased, and T–2 will be cut off. Now the output voltage at the emitters will be very nearly that of the $x$-variable voltage of −6 volts present at the collector electrode of transistor T–1. The output will remain at −6 volts as long as the negative $V_A$ base drive voltage exceeds −6 volts, the $x$-variable voltage magnitude, and at the end of the negative $V_A$ pulse the output voltage will swing positive, causing the above described emitter follower action to begin a new cycle.

Typical characteristics of transistor switches of the types which may be utilized are shown in Fig. 3, wherein collector current $I_c$, emitter current $I_E$, base current $I_B$ and emitter output voltage $E_{OB}$ are shown plotted against $V_A$ base drive voltages. It should be noted that the currents each are very small when base drive voltage $V_A$ is larger than the applied collector voltage $V_x$. In the transition region during which one transistor acts as an emitter follower, collector current $I_c$ and emitter current $I_E$ increases from zero at one extreme to a maximum shortly before the opposite extreme, while base current $I_B$ increases proportionally with base drive voltage $V_A$.

A transistor characteristic which allows provision of an almost ideal switch is the fact that extremely small voltage drops exist between the emitter and collector of the conducting transistor, so that the emitter output voltage corresponds almost exactly to the second variable voltage applied to the transistor collector. In the preferred form of the invention, both transistors of each switch are connected in the grounded collector configuration shown. While such connection requires more power to control the switch, smaller voltage drops exist between collector and emitter of a conducting transistor.

For optimum operation of the time-division multiplier the transistor switches should be able to handle fairly large voltages, the voltage drop across the conducting branch of the switch should be as small as possible, and the switch should be capable of operation at high speeds. To satisfy these requirements, one should use transistors in which the rated collector-base voltages $V_{CB}$, the rated emitter-base voltages $V_{EB}$ and the rated punch-through voltage each are high. Since each of these breakdown voltages depend upon the external base resistance $R_B$, it would be desirable that $R_B$ be made as small as possible. However, it will be seen from Fig. 3 that since the peak emitter and collector currents which flow during the transition mode are determined by the amount of base current which flows in the emitter follower transistor, it may be desirable if $R_B$ is increased to decrease base current $I_B$, thereby to decrease peak emitter and collector currents. Such currents flow only during a portion of the cycle, and the greater the peak values of these currents, the greater the load placed on whatever voltage source is used to supply the analog variable voltages applied to the collector electrodes, causing ripple if such load is too great. Thus two opposite considerations affect selection of the optimum base resistance, and a compromise value may be chosen.

General Electric Company Type 2N43 transistors have been used in one embodiment of the invention. The maximum collector base voltage $V_{CB}$ and the maximum collector-emitter voltage $V_{CE}$ for the transistors utilized were 45 volts and 20 volts, respectively. Measurements of $V_{EB}$ over a large range of base resistances for several dozen of these transistors indicated that the emitter breakdown voltages were in excess of 30 volts.

The collector-emitter voltage drop $V_{CE}$ has been determined in the prior art to be calculable as follows for a grounded emitter transistor:

$$V_{CE}=\frac{kt}{q}\ln\frac{\alpha_I\left[1-\frac{I_c}{I_B}\frac{1-\alpha_N}{\alpha_N}\right]}{1+\frac{I_c}{I_B}(1-\alpha_I)} \qquad (9)$$

and as follows for a grounded collector transistor:

$$V_{CE}=\frac{kt}{q}\ln\frac{\alpha_N\left[1-\frac{I_E}{I_B}\frac{1-\alpha_I}{\alpha_I}\right]}{1+\frac{I_B}{I_E}(1-\alpha_N)} \qquad (10)$$

where $I_E$ is emitter current, $I_B$ is base current, $I_C$ is collector current, $$\frac{kt}{q}$$

is a constant of .26 volts at 25 degrees centigrade, $\alpha_N$ is the forward or normal current amplification factor, and $\alpha_I$ is the inverse current amplification factor. From Expression 9 it may be seen that as collector current approaches zero in a grounded emitter transistor, collector-emitter voltage drop becomes proportional to the inverse current amplification factor $\alpha_I$. From Expression 10 it may be seen that as emitter current approaches zero in a grounded collector transistor, that collector-emitter voltage drop becomes proportional to the forward or normal current amplification factor $\alpha_N$. Since collector junction area exceeds emitter junction area in conventional unsymmetrical transistors, the forward amplification factor $\alpha_N$ is greater than the inverse amplification factor $\alpha_I$ in such transistors, and use of a grounded collector circuit will be seen to provide a smaller voltage drop $V_{CE}$ across the switch. Using Type 2N43 transistors connected as shown in Fig. 1, the voltage drops across the switches measured less than 1 millivolt over a switching voltage range of ±20 volts. While symmetrical switching transistors may be used without departing from the invention, the greater forward amplification factor $\alpha_N$ of currently available unsymmetrical transistors provides lower voltage drops than those provided with currently available symmetric switching transistors, which have a lesser maximum amplification factor.

It is quite desirable that each transistor switch have high enough frequency response to avoid unwarranted distortion of the rectangular base drive voltages applied to it, and it is desirable that the cut-off frequency of each transistor be of the order of 100 times that of the modulation frequency. An embodiment of the invention utilizing Type 2N43 transistors was tested with a multiplier modulation frequency of 1000 cycles. Since the alpha cutoff frequency of such transistors is of the order of one megacycle, no appreciable deterioration of the applied square waves was detected. The frequency response of the entire multiplier circuit is determined both by the maximum switching rate of the transistor switches and the permissible phase shift which can be introduced by the filter. It is desirable that the multiplier modulation frequency be at least ten times as great as the highest frequency which must be observed in the analog variable voltages applied. Using a modulation frequency of one kilocycle, 100 c.p.s. components of the input variable voltages are quite satisfactorily carried through the multiplier.

The dynamic range of the described embodiment of the invention may be determined by considering the maximum and minimum output voltages. The upper limit is governed by the maximum permissible collector voltage (approximately 15 volts with 2N43 transistors), and the lower limit is governed by the voltage drop across the switch, which is of the order of 1 millivolt, as mentioned above, providing a dynamic range of 15,000 or better. Inasmuch as the multiplier output is derived by time-modulation and controlled by a closed loop system the time and temperature stabilities of the device have proven to be excellent. An increase in temperature of 20° C. resulted in an error of less than 0.1% of full scale in the embodiment shown.

Typical circuit values for one embodiment of the invention have been shown in Fig. 1, but it will be understood that these values are exemplary only.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Electronic multiplying apparatus, comprising in combination; time-modulation means responsive to an applied first direct voltage for deriving square-wave pulses, the relative time-widths of said pulses above and below a reference voltage level varying in accordance with the value of said first direct voltage; a transistor switching circuit comprising first and second transistors, each of said transistors having a base, an emitter and a collector electrode; circuit means for connecting said square-wave pulses to the base electrodes of said transistors; a circuit means for applying a pair of opposite-polarity equal-magnitude direct voltages to said collector electrodes, said emitter electrodes of said transistors being interconnected to a first output terminal, and pulse-averaging means connected to said output terminal to provide an output voltage, said time-modulation means comprising a direct-coupled amplifier connected to said applied first direct voltage and to a feedback potential, said direct-coupled amplifier being operable to provide an amplified direct voltage commensurate with the difference between said applied first direct voltage and said feedback potential; means for modulating said amplified direct voltage to provide said square-wave pulses; demodulating means responsive to said square-wave pulses for providing said feedback potential; and circuit means for applying said feedback potential degeneratively to said direct-coupled amplifier.

2. Apparatus according to claim 1 in which said means for modulating said amplified direct voltage comprises means for providing a periodic alternating potential, means for superimposing said alternating potential and said amplified direct voltage to provide a composite potential, and means including a second amplifier driven by said composite potential for providing said square-wave voltages.

3. Apparatus according to claim 2 in which said periodic alternating potential comprises a sinusoidal alternating potential.

4. Apparatus according to claim 1 in which said demodulating means comprises a further pair of transistors having base, emitter and collector electrodes; circuit means for applying said square-wave pulses to said base electrodes; circuit means for applying a further pair of equal-amplitude opposite-polarity variable voltages to said collector electrodes, said emitter electrodes of said further pair of transistors being connected to provide feedback pulses, and filter means connected to said feedback pulses for providing said feedback potential, the amplitudes of said feedback potential thereby being varied in direct proportion to the amplitude of said further pair of variable voltages, whereby said output voltage varies inversely in accordance with said amplitude of said further pair of variable voltages.

5. Apparatus according to claim 2 in which said means for superimposing said alternating potential and said amplified direct potential comprises a transformer having primary and secondary windings, an alternating potential being applied to said primary winding to induce said periodic alternating potential in said secondary winding, said amplified direct potential being connected to said secondary winding to bias said secondary winding with respect to a reference level to provide said composite potential.

6. Apparatus according to claim 2 in which said second amplifier comprises a saturating amplifier having a push-pull output circuit, and in which said push-pull output circuit is connected to apply said square-wave voltages to said base electrodes.

References Cited in the file of this patent

UNITED STATES PATENTS

| | | |
|---|---|---|
| 2,773,641 | Baum | Dec. 11, 1956 |
| 2,864,961 | Lohman et al. | Dec. 16, 1958 |

OTHER REFERENCES

"Waveforms" (Chance, Hughes, MacNichol, Cayre, Williams), published by McGraw-Hill (New York), 1949. (Page 478 relied on.)

"Triangular-Wave Analog Multipliers," Meyers et al., August 1956, Electronics, pages 182–185 of interest.